Patented Dec. 30, 1947

2,433,609

UNITED STATES PATENT OFFICE 2,433,609

ALKANOIC ACID ESTERS OF TRIS(HYDROXYMETHYL)DIMETHYLAMINOMETHANE

Edward B. Hodge, Terre Haute, Ind., assignor to Commercial Solvents Corporation, Terre Haute, Ind., a corporation of Maryland No Drawing. Application May 17, 1946, Serial No. 670,532

4 Claims. (Cl. 260—490)

1

My invention relates to a series of new chemical compounds, and more particularly, it is concerned with esters of tris(hydroxymethyl) dimethylaminomethane and alkanoic acids. These compounds, which may also be designated by the name tris(acyloxymethyl) dimethylaminomethane, have the following general structural formula:

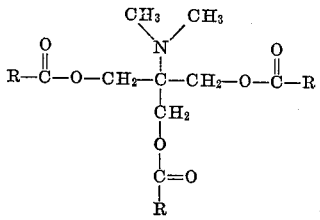

in which the substituent R represents hydrogen or alkyl.

The compounds of my invention are prepared by esterifying tris(hydroxymethyl) dimethylaminomethane with a suitable acid chloride, an aliphatic acid, or an acid anhydride.

The synthesis of tris(hydroxymethyl) dimethylaminomethane may be carried out by a method described in copending application, U. S. Serial No. 441,021, filed April 29, 1942, by Murray Senkus. In the described method, tris(hydroxymethyl) aminomethane and formaldehyde are reacted by merely distilling a mixture of the two compounds in a molar ratio of about 1 to 3, and simultaneously removing water from the distillate until no more water is given off. The residue thus obtained, which consists chiefly of 5 - hydroxymethyl-1-aza - 3,7 - dioxabicyclo-(3.3.0) octane, may then be processed in accordance with known methods to obtain a substantially pure product. Thereafter, the product is subjected to hydrogenation in the presence of a suitable solvent and a suitable hydrogenation catalyst, such as Raney nickel, at a temperature between about 30 and 125° C. and a hydrogen pressure between approximately 500 and 2000 pounds per square inch, splitting the rings and producing tris(hydroxymethyl) dimethylaminomethane, which may be isolated in a known manner, such as by distillation.

After the tris(hydroxymethyl) dimethylaminomethane has been obtained, the esters of my invention are prepared directly therefrom by reacting the tris(hydroxymethyl) dimethylaminomethane with a suitable acid chloride, an aliphatic acid, or an acid anhydride. In instances where it is desired to carry out the esterification with an acid chloride, the reaction mixture should preferably contain a quantity of base, such as sodium or potassium hydroxide, to combine with the hydrogen chloride liberated by the action of the acid chloride on the alcohol. Likewise, it is desirable to employ a suitable solvent such as benzene, for example, in the esterification step.

As illustrations of alkanoic acids, acid anhydrides, and acid chlorides suitable for use in my process may be cited formic acid, acetic acid, acetic anhydride, acetyl chloride, propionic acid, butyric anhydride, valeric acid, caproic acid, and stearyl chloride.

My invention may be more specifically illustrated by the following examples:

Example I

To 49.3 grams of tris(hydroxymethyl) dimethylaminomethane were slowly added 102.1 grams of acetic anhydride with cooling to hold the temperature near 60° C. After all of the acetic anhydride had been introduced, four drops of sulfuric acid were added, and the mixture was heated at 60–70° C. for approximately one hour, and was then allowed to stand overnight. The crude product was next fractionally distilled through a 12-inch Vigreux column, and 13.6 grams of substantially pure tris(acetoxymethyl)-dimethylaminomethane were isolated, having the following properties:

| | |
|---|---:|
| Boiling point _____ °C. at 2.0 mm. Hg __ | 136 |
| Density, $\frac{20}{20}$ °C _____ | 1.1273 |
| Refractive index, $n_D^{20}$ _____ | 1.4529 |
| Nitrogen: | |
|     Found _____ per cent __ | 5.10 |
|     Calculated _____ do ____ | 5.09 |

Example II

To 49.7 grams of tris(hydroxymethyl) dimethylaminomethane were slowly added 130.1 grams of propionic anhydride with cooling to hold the temperature near 60° C. After all of the propionic anhydride had been introduced, four drops of sulfuric acid were added, and the mixture was heated at 60° C. for two hours and then was permitted to stand overnight. The crude product was next fractionally distilled through a 12-inch Vigreux column, and 46.8 grams of substantially pure tris(propionoxymethyl)-dimethylaminomethane were isolated, having the following properties:

| | |
|---|---:|
| Boiling point _____ °C. at 0.8 mm. Hg __ | 147 |
| Density, $\frac{20}{20}$ °C _____ | 1.0726 |
| Refractive index, $n_D^{20}$ _____ | 1.4510 |
| Nitrogen: | |
|     Found _____ per cent __ | 4.40 |
|     Calculated _____ do ____ | 4.42 |

The tris(acyloxymethyl) dimethylaminomethanes are in general water-white liquids which are soluble in ether, benzene, petroleum ether, and methanol. The higher-boiling esters have been found to possess utility as plasticizers for various vinyl resins. These new esters are likewise useful in the synthesis of other valuable organic compounds. Additional uses of such materials will be obvious to those skilled in the art.

This application is a continuation-in-part of my application Serial No. 533,939, filed May 3, 1944 now abandoned.

In accordance with the foregoing specification, I claim as my invention:

1. Tris(acyloxymethyl) dimethylaminomethanes having the following structural formula:

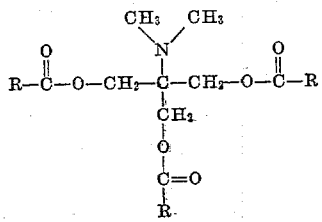

in which the substituent R is selected from the group consisting of hydrogen and alkyl.

2. Tris(acetoxymethyl) dimethylaminomethane.
3. Tris(propionxymethyl) dimethylaminomethane.
4. Tris(butyroxymethyl) dimethylaminomethane.

EDWARD B. HODGE.

REFERENCES CITED

The following references are of record in the file of this patent:

UNITED STATES PATENTS

| Number | Name | Date |
|---|---|---|
| 2,363,466 | Senkus | Nov. 21, 1944 |
| 2,379,381 | Shelton et al. | June 26, 1945 |

OTHER REFERENCES

Piloty et al., Ber. Deut. Chem., vol. 30 (1897), p. 2065.

Barbiere et al., "Bull. Soc. Chim de France," vol. 5 (5) (1938), pp. 1565-1567.